Patented July 2, 1935

2,006,555

UNITED STATES PATENT OFFICE 2,006,555

ESTERS OF POLYCARBOXYLIC ACIDS AND THEIR PRODUCTION

Emmette F. Izard, Elsmere, Del., assignor to E. I. du Pont de Nemours & Company, Wilmington, Del., a corporation of Delaware No Drawing. Application February 1, 1934, Serial No. 709,328

11 Claims. (Cl. 260—106)

This invention relates to esters of dicarboxylic acids, and more particularly to dicarboxylic acid esters of monohydric ether alcohols in which the acid is a saturated or unsaturated aliphatic dicarboxylic acid containing from 6 to 10 carbon atoms inclusive, and the monohydric ether alcohol is a methoxy substituted alkanol. The invention also relates to a method of preparing these esters.

This case is a continuation in part of applicant's copending application Serial No. 631,100, filed on August 30, 1932.

An object of the invention is to provide an economical and practical method of preparing dicarboxylic acid esters of monohydric methoxyalkanols. A further object is to provide new esters of this type having valuable properties. Other objects of the invention will be apparent from the description hereinafter given.

The above objects are accomplished, according to the present invention, by reacting a saturated or unsaturated aliphatic dicarboxylic acid containing from 6 to 10 carbon atoms, inclusive, with a monohydric methoxyalkanol in the presence of a catalyst at an elevated temperature and removing the water formed by said reaction from the reaction zone. Alternatively the esters may be prepared by reacting an ester of an acid of the group specified with a monohydric methoxyalkanol having a higher boiling point than the alcohol formed upon hydrolysis of the ester used as a starting material.

The use of a catalyst is not essential although it is preferred. Sulfuric acid, metallic sodium, hydrogen chloride gas, phenol sulfonic acid and similar sulfonic acids, may be used as catalysts in the reaction. The temperature may be varied widely but it is preferred to keep it between 80 and 200° C. If desired, an inert high boiling solvent such as toluol may be used in the reaction mixture to facilitate the removal of the water formed during the reaction, or the alcohol formed during the reaction, where an ester is used as a starting material. The esters may also be made by the use of the acid chloride or the acid anhydride upon the methoxyalkanol or by the reaction of the halide ester of the methoxyalkanol upon the sodium or other salt of the aliphatic dicarboxylic acid.

The following examples are given to illustrate the preparation of esters according to the present invention:

EXAMPLE 1

*Methoxyethyl adipate*

A mixture containing 1800 g. adipic acid, 2500 g. methoxyethanol, 1000 g. toluol, and 45 g. sulfuric acid was heated to boiling in an apparatus designed to separate the water from the distillate and return the organic solvent to the reaction vessel. After 6 hours heating it was found that approximately 95% of the adipic acid had been esterified. The product was treated with potassium carbonate to remove the excess acid, then purified by vacuum distillation. Methoxyethyl adipate distills between 195°–205° C. at 12 mm. pressure. This derivative is a very satisfactory plasticizer for use with cellulose derivatives, both esters and ethers.

EXAMPLE 2

*Methoxyethoxyethyl sebacate*

A mixture containing 230 g. of dimethyl sebacate, 250 g. methoxyethoxyethanol, 200 g. toluene and 5 g. litharge was heated to boiling under a good distilling column until the theoretical amount of methanol had been recovered in the distillate. The product was filtered to remove the litharge and heated to 130° at 25 mm. pressure to remove the toluene and unreacted alcohol. The product was treated with decolorizing carbon and filtered. The resulting product was substantially water white.

The above example illustrates the preparation of these esters using an ester of a dicarboxylic acid as a starting material. Any other simple ester of a dicarboxylic acid could be substituted for the methyl ester of the above example. Likewise, any other methoxyalkanol can be substituted for the methoxyethoxyethanol, providing the methoxyalkanol has a higher boiling point than the alcohol formed upon hydrolysis of the dicarboxylic acid ester used as the starting material.

The esters coming within the scope of the present invention include the esters of the saturated aliphatic dicarboxylic acids having from 6 to 10 carbon atoms, inclusive, such as adipic, methyl adipic, dimethyl adipic, pimelic, suberic, azelaic, and sebacic acids, and the esters of the unsaturated aliphatic dicarboxylic acids having from 6 to 10 carbon atoms, inclusive, such as dihydromuconic, muconic, diacetylenedicarboxylic, dipropargyldicarboxylic, piperylenedicarboxylic, xeronic, and tetraacetylenedicarboxylic acids. With some of those containing triple bonds, care must be exercised in the preparation due to the instability of the free acids. For this and other reasons the esters of the saturated aliphatic dicarboxylic acids represent a preferred form of the present invention. These acids may be esterified with a monohydric methoxyalkanol represented by the formula $CH_3OROH$, in which R represents a divalent aliphatic radical, such as ethylene $—CH_2—CH_2—$, propylene $—CH(CH_3)—CH_2—$, trimethylene $—CH_2—CH_2—CH_2—$, ethyleneoxyetyhl $—CH_2—CH_2—O—CH_2—CH_2$, methoxypropylene $—CH_2—CH(OCH_3)—CH_2$ ethyleneoxyethyleneoxyethyl $—CH_2—CH_2—O—CH_2—CH_2—O—CH_2—CH_2—$ butoxypropylene —CH₂—CH(OC₄H₉)—CH₂—, bismethoxymethylpropylene
—CH₂—C(CH₂OCH₃)₂—CH₂.

Besides the methoxyalkanols described in the specific examples, the monomethyl ethers of propylene glycol, trimethylene glycol, diethylene glycol, triethylene glycol, the dimethyl ethers of trihydric alcohol such as glycerine, the trimethyl ethers of tetrahydric alcohols such as pentaerythritol, among others, may be used advantageously to esterify the dicarboxylic acid. Methoxyalkanols of the type of 2-methoxy-3-ethoxypropanol-1 and 2-methoxy-3-butoxypropanol-1, may also be used.

The dicarboxylic acid may be completely or partially esterified or may have the hydrogen atom of one carboxyl group esterified with a methoxyalkanol, and the other with any other monovalent organic radical such as methyl, ethyl, butyl, phenyl, benzyl, stearyl, lauryl, butoxyethyl, naphthyl, etc. These mixed esters may be prepared from the methoxyalkanol and an appropriate acid ester e. g. monobutyl sebacate. The present invention, therefore, includes the half esters or acid esters, the mixed esters in which the hydrogen atom of at least one carboxyl group is esterified with a methoxyalkanol, and the neutral esters in which the hydrogen atom of each carboxyl group is esterified with a methoxyalkanol.

The esters of the present invention are all either water white-liquids or white solids, when in the pure state, although they may be amber colored when impurities are present. Some of them are substantially insoluble in water while others are appreciably miscible therewith. They are miscible with the ordinary lacquer solvents such as alcohols, ketones, esters and hydrocarbons. They are compatible in high proportions with cellulose nitrate, ethyl cellulose, and cellulose acetate. Films containing cellulose derivative compositions containing the neutral esters coming within the scope of the present invention are very tough and flexible and because of the high boiling point of the esters substantially permanent flexibility of the films is obtained. The plasticizers of the present invention may be used with cellulose nitrate, cellulose acetate, and ethyl cellulose, together with resins such as damar, pigments, and oils such as castor oil.

The compositions may be prepared with or without the usual volatile solvents or diluents, such as alcohols for cellulose nitrate compositions, acetone for cellulose acetate compositions, and toluol in alcohol mixtures for the ether compositions. In all of the above examples the plasticizer may be replaced in part by the other esters herein described, or by one or more of the heretofore known plasticizers. Other cellulose derivatives such as cellulose propionate, cellulose butyrate, cellulose acetobutyrate, cellulose nitroacetate, and benzyl cellulose, may be used with the esters of the present invention. Likewise, other resins than damar, such as ester gum and synthetic resins such as the polyhydric alcohol-polybasic acid resins may be used. Oils other than castor, e. g., Chinawood, linseed, soya bean, or cottonseed, may be used. The cellulose derivative compositions herein disclosed may be used as lacquers for coating metal, leather, paper, and wood, in dopes for coating fabrics, in plastic compositions to be used in the preparation of toilet ware, novelties, sheeting, rods, tubes, photographic films, and in similar uses.

As many apparently widely different embodiments of this invention may be made without departing from the spirit and scope thereof, it is to be understood that I do not limit myself to the specific embodiments thereof except as defined in the appended claims.

I claim:

1. As a new compound, an ester of an aliphatic dicarboxylic acid containing from 6 to 10 carbon atoms, inclusive, wherein the hydrogen atom of at least one carboxyl group is replaced by a group of atoms represented by the formula CH₃—O—R— in which R represents a radical from the group consisting of divalent aliphatic hydrocarbon radicals and divalent aliphatic radicals including at least one ether linkage.

2. As a new compound, a methoxyalkyl ester of an aliphatic dicarboxylic acid containing from 6 to 10 carbon atoms, inclusive.

3. An ester of an aliphatic dicarboxylic acid containing from 6 to 10 carbon atoms, inclusive, wherein the hydrogen atom of each carboxyl group is replaced by a group of atoms represented by the formula CH₃—O—R— in which R represents a radical from the group consisting of divalent aliphatic hydrocarbon radicals and divalent aliphatic radicals including at least one ether linkage.

4. An ester of an aliphatic dicarboxylic acid containing from 6 to 10 carbon atoms, inclusive, wherein the hydrogen atom of at least one carboxyl group is replaced by the methoxyethyl radical.

5. An ester of an aliphatic dicarboxylic acid containing from 6 to 10 carbon atoms, inclusive, wherein the hydrogen atom of each carboxyl group is replaced by the methoxyethyl radical.

6. An ester of an aliphatic dicarboxylic acid containing from 6 to 10 carbon atoms, inclusive, wherein the hydrogen atom of one carboxyl group is replaced by the methoxyethyl radical, and the hydrogen atom of the remaining carboxyl group is replaced by a monovalent hydrocarbon radical derived from an organic hydroxyl compound.

7. As a new compound, methoxyethyl adipate.

8. As a new compound, methoxyethoxyethyl sebacate.

9. Method of preparing an ester of an aliphatic dicarboxylic acid containing from 6 to 10 carbon atoms, inclusive, wherein the hydrogen atom of at least one carboxyl group is replaced by a group of atoms represented by the formula CH₃OR, in which R represents a radical from the group consisting of divalent aliphatic hydrocarbon radicals and divalent aliphatic radicals including at least one ether linkage which comprises reacting a compound from the group consisting of said acids and esters of said acids with a monohydric methoxyalkanol of the type represented by the formula CH₃OROH, said ether alcohol having a higher boiling point than the alcohol formed by hydrolysis of the dicarboxylic acid ester with which it is to be reacted, and removing the volatile reaction product formed by said reaction from the reaction zone.

10. Method of preparing methoxyethyl adipate, which comprises reacting adipic acid with methoxyethanol and removing the water formed by said reaction.

11. Method of preparing methoxyethoxyethyl sebacate, which comprises reacting methoxyethoxyethanol with dimethyl sebacate, and removing the methyl alcohol formed by said reaction.

EMMETTE F. IZARD.